(12) United States Patent
Wen

(10) Patent No.: US 9,752,613 B1
(45) Date of Patent: Sep. 5, 2017

(54) HOOK

(71) Applicant: NOBLE CORPORATION, Zhong Shan, Guangdong Province (CN)

(72) Inventor: Qiang Ye Wen, Zhong Shan (CN)

(73) Assignee: Gardenia Industrial Limited, Tortola (VG)

( * ) Notice: Subject to any disclaimer, the term of this patent is extended or adjusted under 35 U.S.C. 154(b) by 0 days.

(21) Appl. No.: 15/232,499

(22) Filed: Aug. 9, 2016

(30) Foreign Application Priority Data

May 5, 2016 (CN) ...................... 2016 2 0396422 U

(51) Int. Cl.
*F16B 45/02* (2006.01)
*F21V 21/08* (2006.01)

(52) U.S. Cl.
CPC .............. *F16B 45/02* (2013.01); *F21V 21/08* (2013.01); *Y10T 24/4072* (2015.01); *Y10T 24/44017* (2015.01); *Y10T 24/44026* (2015.01)

(58) Field of Classification Search
CPC .... F21V 21/08; F16B 45/02; Y10T 24/44026; Y10T 24/44017; Y10T 24/4072
See application file for complete search history.

(56) References Cited

U.S. PATENT DOCUMENTS

| | | | | | |
|---|---|---|---|---|---|
| 3,255,502 A | * | 6/1966 | Hollins | .............. | A44B 11/2526 24/191 |
| 3,847,423 A | * | 11/1974 | Gley | ....................... | E05C 19/14 292/113 |
| 6,840,551 B2 | * | 1/2005 | Evans | ..................... | E05C 19/14 24/68 CD |
| 8,544,153 B2 | * | 10/2013 | Mayberry | ................. | F16B 2/10 224/150 |
| 2004/0187270 A1 | * | 9/2004 | Lee | ........................ | A44B 11/25 24/170 |

* cited by examiner

*Primary Examiner* — Robert J Sandy
(74) *Attorney, Agent, or Firm* — Lewis Roca Rothgerber Christie LLP

(57) ABSTRACT

A hook assembly includes a substrate having three tabs arranged in a triangular configuration, a hook including a pair of opposing side flaps, and a tripod mounting member configured to couple the hook to the substrate. The tripod mounting member includes three legs arranged in a triangular configuration, a pair of opposing side plates extending from two rear legs of the three legs, and a stopper groove. The three legs of the tripod mounting member correspond to the three tabs of the substrate. The hook assembly also includes a torsion spring having a pair of arms extending from opposite ends of the torsion spring, a first fastener configured to couple the tripod mounting member to the substrate, and a second fastener configured to extend through the side plates of the tripod mounting member and the side flaps of the hook to rotatably couple the hook to the tripod mounting member.

5 Claims, 4 Drawing Sheets

HOOK

CROSS-REFERENCE TO RELATED APPLICATION

The present application claims priority to and the benefit of Chinese Application No. 201620396422.X, filed on May 5, 2016, the entire contents of which are incorporated herein by reference.

FIELD

The present disclosure relates generally to mechanical hooks.

BACKGROUND

Lighting fixtures, such as downlights and ceiling lamps, as well as some hardware products are often secured or fixed to a wall with a spring hook. Related art spring hooks are typically fixedly connected to the wall and/or to the product with fasteners (e.g., screws) and nuts. Accordingly, installation of related art spring hooks may be time consuming. Additionally, the screws and/or nuts used to install these related art spring hooks are prone to disengagement due to unthreading. Related art spring hooks are also prone to swinging and/or swiveling (e.g., rotating about the axis of the screw), and therefore these related art spring hooks may not provide a stable structure to support lighting fixtures or other products.

SUMMARY

The present disclosure is directed to various embodiments of a hook assembly. In one embodiment, the hook assembly includes a substrate having three tabs arranged in a triangular configuration, a hook including a pair of opposing side flaps, and a tripod mounting member configured to couple the hook to the substrate. The tripod mounting member includes three legs arranged in a triangular configuration, a pair of opposing side plates extending from two rear legs of the three legs, and a stopper groove. The three legs of the tripod mounting member correspond to the three tabs of the substrate. The hook assembly also includes a torsion spring having a pair of arms extending from opposite ends of the torsion spring, a first fastener configured to couple the tripod mounting member to the substrate, and a second fastener configured to extend through the side plates of the tripod mounting member and the side flaps of the hook to rotatably couple the hook to the tripod mounting member. When the hook assembly is in an assembled state, the side plates of the tripod mounting member are between the side flaps of the hook, the legs of the tripod mounting member are overlapped by the tabs on the substrate, the torsion spring extends between the side plates of the tripod mounting member and is wound around at least a portion of the second fastener, and one arm of the pair of arms of the torsion spring extends into the stopper groove of the tripod mounting member and the other arm of the pair of arms of the torsion spring engages the hook. The tabs on the substrate may be formed by any suitable manufacturing technique or process, such as stamping. The stopper groove may not be centered between the two rear legs. The first and second fasteners may be any suitable type or kind of fasteners, such as rivets.

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

Figure 1:
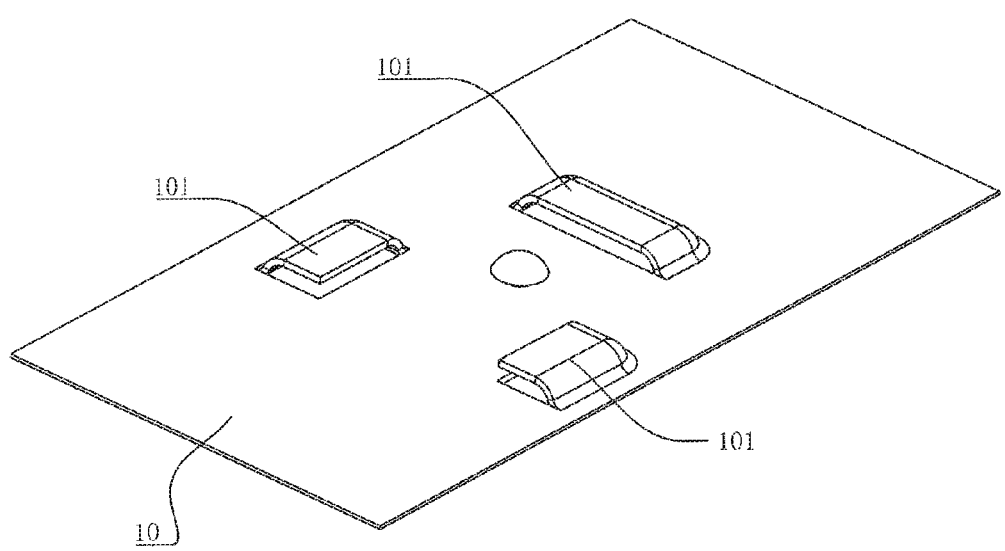
FIG. 1 is a perspective view of a substrate according to one embodiment of the present disclosure.

The present disclosure is directed to various embodiments of a hook assembly configured to mitigate swiveling of a hook and thereby enhance fixation of the hook to a structure, such as a wall or a ceiling, and/or to a fixture (e.g., the body of a light fixture installed on a ceiling). The assembly may be coupled either directly or indirectly to the structure and/or the fixture.

With reference to FIGS. 1-5, a hook assembly according to one embodiment of the present disclosure includes a substrate 10 configured to be installed on or in a surface (e.g., a wall), a tripod mounting member 20, a spring 30 (e.g., a torsion spring), and a hook 40. The tripod mounting member 20 is configured to couple the hook 40 to the substrate 10. The hook 40 is configured to support a lighting fixture or any other suitable product. In the illustrated embodiment, the hook assembly also includes a first fastener 50 (e.g., a rivet) for coupling the tripod mounting member 20 to the substrate 10 and a second fastener 60 (e.g., a pin) for rotatably coupling the hook 40 to the tripod mounting member 20.

In the illustrated embodiment, the substrate 10 includes three buckles or tabs 101 extending outward from an outer surface of the substrate 10. Each of the tabs 101 defines a slot for receiving a portion of the tripod mounting member 20, as described in more detail below. In the illustrated embodiment, the tabs 101 are arranged in a triangular configuration, although in one or more embodiments the tabs 101 may be arranged in any other suitable configuration. The tabs 101 may be formed in the substrate 10 by any suitable manufacturing process or technique, such as press-molding (e.g., stamping).

Figure 2:
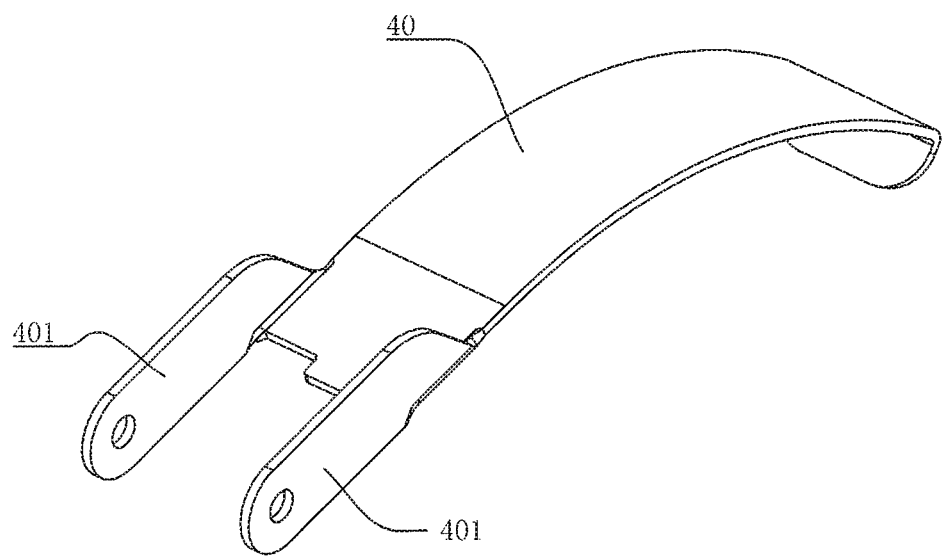
FIG. 2 is a perspective view of a hook according to one embodiment of the present disclosure.

In the embodiment illustrated in FIG. 2, the hook 40 includes an arcuate body portion, a pair of opposing side flaps 401 located at one end of the arcuate body portion, and a lip (e.g., a return flange) located at an opposite end of the arcuate body portion. Although in the illustrated embodiment the body portion of the hook 40 is curved, in one or more embodiments the body portion of the hook 40 may be straight or substantially straight. The pair of opposing side flaps 401 is configured to connect the hook 40 to the tripod mounting member 20.

Figure 3:
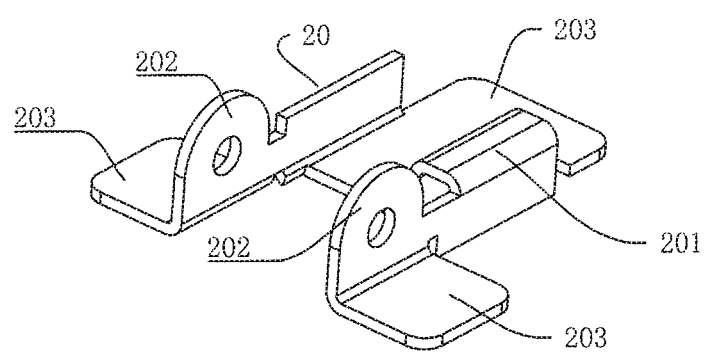
FIG. 3 is a perspective view of a tripod mounting member according to one embodiment of the present disclosure.

In the embodiment illustrated in FIG. 3, the tripod mounting member 20 includes a raised segment defining a stopper groove or channel 201, a pair of opposing side plates 202, and three legs 203 arranged in a triangular configuration (e.g., the mounting member 20 includes a front leg and a pair of opposing rear legs). The side plates 202 of the tripod mounting member 20 correspond to the side flaps 401 of the hook 40. In the illustrated embodiment, the side plates 202 are located along inside edges of the pair of rear legs 203. Additionally, in the illustrated embodiment, the side plates 202 extend up from the pair of rear legs 203 at a 90-degree angle or substantially a 90-degree angle (i.e., the side plates 202 are orthogonal or substantially orthogonal to the rear legs 203), although in one or more embodiments, the side plates 202 may extend up from the pair of rear legs 203 at any other angle corresponding to the orientation of the side flaps 401 on the hook 40. Additionally, the three legs 203 of the tripod mounting member 20 are configured (e.g., sized and positioned) to mate or engage with the three tabs 101 on the substrate 10 (e.g., the three legs 203 of the tripod mounting member 20 correspond to the three tabs 101 on the substrate 10). In the illustrated embodiment, the stopper groove 201 is located proximate to one of the rear legs 203 (e.g., the stopper groove 201 is not centered between the two rear legs 203) and extends lengthwise between one of the rear legs 203 and the front leg 203.

Figure 4:
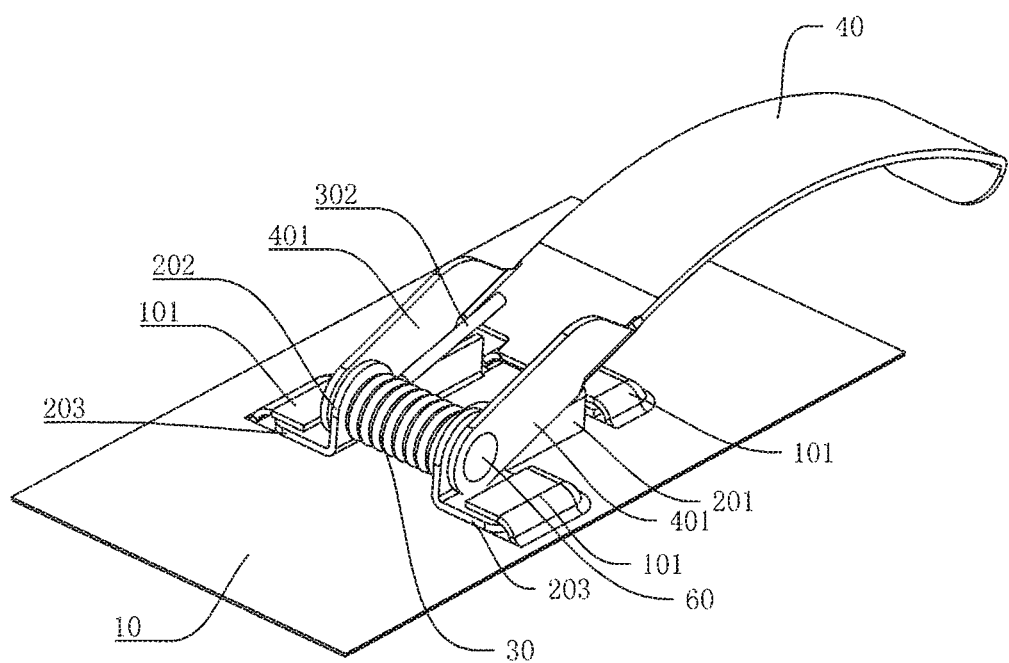
FIGS. 4-5 are perspective views of an assembled hook assembly according to one embodiment of the present disclosure incorporating the embodiments of the substrate, the hook, and the tripod mounting member illustrated in FIGS. 1-3.
Figure 5:
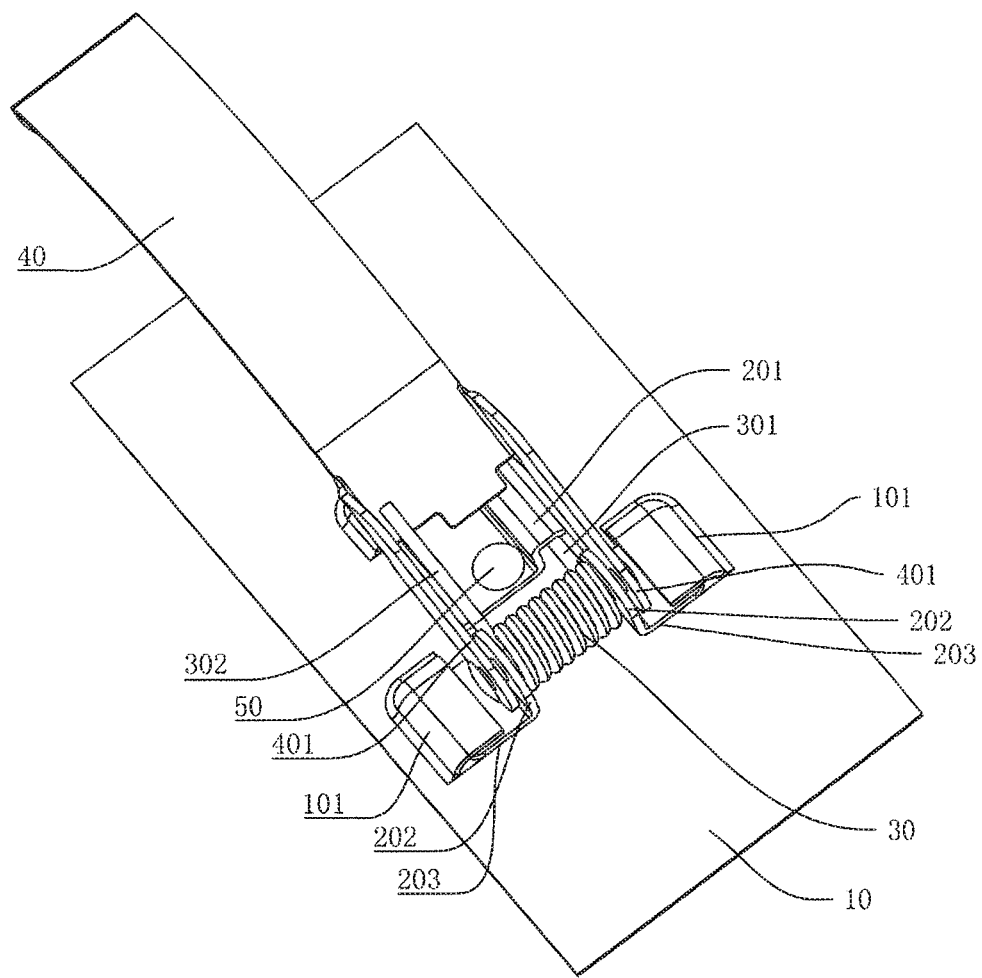

As illustrated in FIGS. 4-5, when the hook assembly is assembled, at least a portion of each of the legs 203 of the tripod mounting member 20 extend into corresponding slots defined by the tabs 101 on the substrate 10. When the legs 203 of the tripod mounting member 20 extend into the slots in the substrate 10, the tabs 101 on the substrate 10 overlap or overhang at least a portion of the legs 203 of the tripod mounting member 20. Additionally, in the illustrated embodiment, when the hook assembly is assembled, the side flaps 401 of the hook 40 are positioned outside of the corresponding side plates 202 of the tripod mounting member 20 (i.e., the side plates 202 of the tripod mounting member 20 extend between the side flaps 401 of the hook 40), the spring 30 extends between the opposing side plates 202 of the tripod mounting member 20, and the second fastener 60 extends through openings in the side flaps 401 of the hook 40 and corresponding openings in the side plates 202 of the tripod mounting member 20 to rotatably couple the hook 40 to the tripod mounting member 20. In the illustrated embodiment, the spring 30 is wound around at least a portion of the second fastener 60 (e.g., the second fastener 60 extends through an opening defined by the torsion spring 30). Although in the illustrated embodiment the second fastener 60 is a rivet, in one or more embodiments, the second fastener 60 may be any other type or kind of fastener suitable for rotatably coupling the hook 40 to the tripod mounting member 20, such as a pin. The engagement between the legs 203 of the tripod mounting member 20 and the tabs 101 of the substrate 10 is configured to prevent the tripod mounting member 20, and the hook 40 coupled thereto, for swiveling relative to the substrate 10. That is, the tripod mounting member 20 is configured to properly position and secure the hook 40 on the substrate 10. Accordingly, the hook assembly of the present disclosure is configured to provide a stable structure to support lighting fixtures or other products, unlike related art spring hooks that incorporate screws and/or nuts, which are prone to failure or disengagement due to unthreading.

Additionally, in the illustrated embodiment, spring 30 includes a pair of pins or arms 301, 302 located at opposite ends of the spring 30. In the illustrated embodiment, the wound portion of the spring 30 is aligned or substantially aligned with the side plates 202 of the tripod mounting member 20 and side flaps 401 of the hook 40, and the arms 301, 302 on the ends of the spring 30 extend out toward the front tab 101 on the substrate 10. In the illustrated embodiment, when the hook assembly is assembled, one of the arms 302 of the spring 30 engages an outer surface of the hook 40 and the other arm 301 of the spring 30 is received in the stopper groove 201 of the tripod mounting member 20 (e.g., the tripod stopper groove 201 of the tripod mounting member 20 retains and overlaps one of the arms 301 of the spring 30 and the other arm 302 of the spring 30 overlaps an outer surface of the hook 40. Accordingly, when the hook 40 is pulled (e.g., rotated away from the substrate 10), the engagement between one of the arms 302 of the spring 30 and the hook 40 causes the spring 30 to wind more tightly. When the hook 40 is released, the restorative force created by the more tightly wound spring 30 tends to force hook 40 to rotate back toward the substrate 10. In this manner, the spring 30 is configured to bias the hook 40 to return to its initial position.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," and similar terms have been used herein to describe a spatial relationship of one element to another, it is understood that these terms are intended to encompass different orientations of the various elements and components of the invention in addition to the orientation depicted in the figures. Additionally, as used herein, the term "substantially" and similar terms are used as terms of approximation and not as terms of degree, and are intended to account for the inherent deviations in measured or calculated values that would be recognized by those of ordinary skill in the art. Furthermore, as used herein, when a component is referred to as being "on" another component, it can be directly on the other component or components may also be present therebetween. Moreover, when a component is component is referred to as being "coupled" to another component, it can be directly attached to the other component or intervening components may be present therebetween.

What is claimed is:

1. A hook assembly comprising:
   a substrate to be mounted on a surface, the substrate comprising three tabs arranged in a triangular configuration;
   a hook comprising a pair of opposing side flaps;
   a tripod mounting member configured to couple the hook to the substrate, the tripod mounting member comprising:
      three legs arranged in a triangular configuration, the three legs corresponding to the three tabs of the substrate;
      a pair of opposing side plates extending from two rear legs of the three legs; and
      a stopper groove;

a torsion spring comprising a pair of arms extending from opposite ends of the torsion spring; and a first fastener configured to couple the tripod mounting member to the substrate;

a second fastener configured to extend through the side plates of the tripod mounting member and the side flaps of the hook to rotatably couple the hook to the tripod mounting member, wherein, when the hook assembly is in an assembled state:

the side plates of the tripod mounting member are between the side flaps of the hook, the legs of the tripod mounting member are overlapped by the tabs on the substrate, the torsion spring extends between the side plates of the tripod mounting member and is wound around at least a portion of the second fastener, and one arm of the pair of arms of the torsion spring extends into the stopper groove of the tripod mounting member and the other arm of the pair of arms of the torsion spring engages the hook.

2. The hook assembly of claim 1, wherein the three tabs are stamped.

3. The hook assembly of claim 1, wherein the stopper groove is not centered between the two rear legs.

4. The hook assembly of claim 1, wherein the first fastener is a rivet.

5. The hook assembly of claim 1, wherein the second fastener is a rivet.

* * * * *